A. I. JACOBS.
CHUCK.
APPLICATION FILED MAR. 16, 1908.

911,012.

Patented Jan. 26, 1909.

WITNESSES:

INVENTOR:

Arthur I. Jacobs,
by Harry P. Williams
Atty.

UNITED STATES PATENT OFFICE.

ARTHUR I. JACOBS, OF HARTFORD, CONNECTICUT, ASSIGNOR TO THE JACOBS MANUFACTURING COMPANY, OF HARTFORD, CONNECTICUT, A CORPORATION OF CONNECTICUT.

CHUCK.

No. 911,012.     Specification of Letters Patent.     Patented Jan. 26, 1909.

Application filed March 16, 1908. Serial No. 421,553.

*To all whom it may concern:*

Be it known that I, ARTHUR I. JACOBS, a citizen of the United States, residing at Hartford, in the county of Hartford and State of Connecticut, have invented a new and useful Chuck, of which the following is a specification.

This invention relates to a chuck which is designed to be applied to a sensitive drill press, high speed drill press, lathe, electric drill, breast drill and similar drilling, tapping and boring machines, for holding a drill, tap, bit or the like tool, of the class in which the jaws are moved in inclined recesses in the body by means of an exterior nut or sleeve for the purpose of gripping and releasing the shank of the tool.

The object of the invention is to produce a simple, and cheap article of this nature which is easily and quickly manipulated so as to very tightly grip or release the tool shank.

Figure 1:
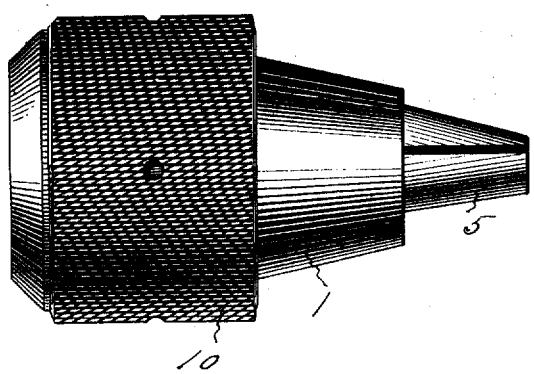
Figure 2:
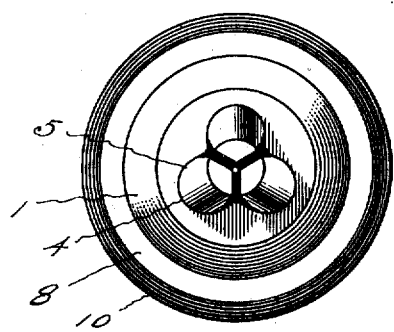
Figure 3:
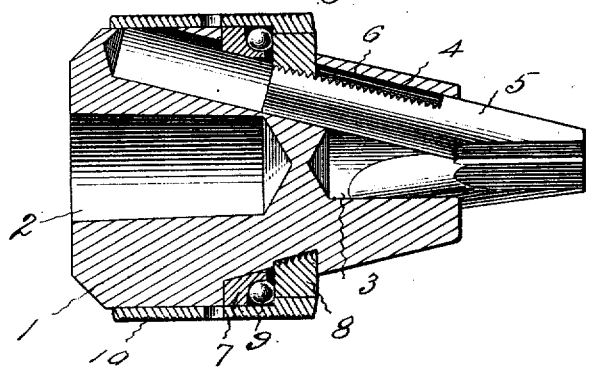
Figure 4:
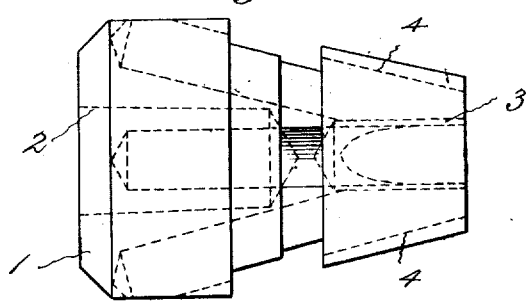

Figure 1 of the accompanying drawings shows a side elevation of a chuck which embodies the invention. Fig. 2 is a view looking at the jaw end of the chuck. Fig. 3 is a longitudinal section of the chuck and Fig. 4 is a side view of the body of the chuck.

The body 1 of the chuck has in one end a socket 2 for receiving the stem of the machine spindle, which socket is preferably tapered as shown, but which may be straight if desired. In the other end the body has a socket 3 for receiving the shank of the tool. If desired, these sockets may communicate so as to provide an opening entirely through the center of the body. The body also has inclined jaw sockets 4 of which there may be any desired number. In the chuck shown there are three of these jaw sockets for receiving the three jaws 5, each of which has a section of screw thread 6 formed on its outer side near one end and has its opposite side near the other end shaped, preferably by milling it off to an edge, so that the jaws may grip the shank of a small tool.

The body of the chuck shown has an annular recess in which is placed a ring 7 that has its inner wall shaped to correspond with the tapering bottom wall of the recess and to fit over the jaws without interfering with their movement. The forward and outer edge of the ring is preferably curved so as to form a ball race. Placed in the annular recess in the body in front of the ring is a sectional nut 8 the rear edge of which bears against the balls 9 which are located in the annular recess between the ring and the nut. The interior wall of the nut is provided with screw threads designed to fit the sectional threads formed on the outer edges of the jaws.

Upon the outside of the body and the nut is a sleeve 10. This sleeve is secured to the nut by being driven thereon or otherwise fastened thereto so that the nut and the sleeve will turn together, and while the sleeve closely fits the exterior of the body, it is not fastened thereto. The outer surface of this sleeve may be knurled, milled or otherwise roughened for the purpose of providing a grip or an ornamentation.

When the sleeve and consequently the nut which is fastened to it are turned in one direction with relation to the body the threads in the interior of the nut engaging the sectional threads on the backs of the jaws, move the jaws forwardly and cause a contraction of the space between them. When the sleeve and nut are turned the other way the jaws are drawn backwardly and consequently the space between them is expanded. The nut is held against movement in one direction by the front end wall of the annular recess in the body, and from movement in the other direction by the balls between the nut and the ring. When the jaws are being drawn in and the space between them increased for releasing the shank of a tool, the nut thrusts against the front wall of the annular recess, but when the nut is turned so as to force the jaws outwardly for causing them to grip the shank of the tool the thrust of the nut is against the balls.

This construction is very simple to manufacture and easy to assemble, and as a result of the employment of the balls in this way, the friction incident to the backward thrust of the nut is so reduced that the jaws can be forced very quickly and very powerfully against the shank of the drill, thus rendering unnecessary the employment of any tool for turning the sleeve or nut. However, an ordinary spanner or other tool can be employed if desired for turning the sleeve or nut. It is to be understood that rolls may be used instead of balls and that when balls are mentioned it is intended to include rolls as the equivalent of balls.

The invention claimed is:

1. A chuck having a body with an annular recess and inclined sockets, a nut rotarily mounted in said annular recess, a ring located in said annular recess, balls arranged between the nut and the ring, and jaws movable in the inclined sockets and having threads engaged with the threads of the nut, substantially as specified.

2. A chuck having a body with an annular recess and inclined sockets, a nut rotarily mounted in said recess and held against longitudinal movement in one direction by the body of the chuck, a ring located in said recess, balls arranged between the nut and the ring to prevent the nut from moving longitudinally in the opposite direction, a sleeve extending over the recess encircling the body and attached to the nut, and jaws movable in the sockets and having threads engaged with threads of the nut, substantially as specified.

3. A chuck having a body with an annular recess and inclined sockets that open through one end of the body and also open into the recess, a nut rotarily mounted in the front part of said annular recess and having interior threads, a ring located in the rear part of the said annular recess, said ring being arranged to cover openings from the inclined sockets into the annular recess, balls arranged around the ring between the nut and the ring and jaws movable in the inclined sockets and having threads engaged by the threads of the nut, substantially as specified.

ARTHUR I. JACOBS.

Witnesses:
JOSEPHINE M. STREMPFER,
HARRY R. WILLIAMS.